United States Patent [19]
Moon

[11] Patent Number: 5,517,071
[45] Date of Patent: May 14, 1996

[54] SUPERCONDUCTING LEVITATING BEARING

[75] Inventor: Francis C. Moon, Ithaca, N.Y.

[73] Assignee: Cornell Research Foundation, Inc., Ithaca, N.Y.

[21] Appl. No.: 329,132

[22] Filed: Oct. 25, 1994

Related U.S. Application Data

[63] Continuation of Ser. No. 959,729, Oct. 13, 1992, abandoned.

[51] Int. Cl.$^6$ .......................... H02K 7/09; H02K 55/00
[52] U.S. Cl. ...................... 310/90.5; 505/166; 505/876
[58] Field of Search ................ 310/90, 90.5; 505/166, 505/211, 876, 877, 878

[56] References Cited

U.S. PATENT DOCUMENTS

| | | | |
|---|---|---|---|
| 4,895,831 | 1/1990 | Laskaris | 505/1 |
| 4,914,081 | 4/1990 | Miller et al. | 505/1 |
| 4,923,850 | 5/1990 | Stephan et al. | 505/1 |
| 4,939,120 | 7/1990 | Moon et al. | 505/1 |
| 4,956,571 | 9/1990 | Gordon et al. | 310/90.5 |
| 5,015,622 | 5/1991 | Ward et al. | 505/1 |
| 5,061,679 | 10/1991 | Weeks, II | 505/1 |
| 5,066,638 | 11/1991 | Lloyd et al. | 505/1 |
| 5,099,162 | 3/1992 | Sawada | 310/198 |
| 5,107,240 | 4/1992 | Tashiro et al. | 336/60 |
| 5,113,165 | 5/1992 | Ackermann | 335/216 |
| 5,117,139 | 5/1992 | Flom et al. | 310/90.5 |
| 5,159,219 | 10/1992 | Chu et al. | 310/90.5 |
| 5,177,387 | 1/1993 | McMichael et al. | 310/90.5 |
| 5,256,637 | 10/1993 | Rao | 505/1 |
| 5,256,638 | 10/1993 | Weinberger et al. | 505/1 |
| 5,313,130 | 5/1994 | Shibayama et al. | 310/90.5 |
| 5,325,002 | 6/1994 | Rabinowitz et al. | 505/166 |
| 5,342,825 | 8/1994 | Iannello et al. | 505/166 |
| 5,438,038 | 8/1995 | Takahata et al. | 310/90.5 |

*Primary Examiner*—Matthew V. Nguyen
*Attorney, Agent, or Firm*—Ohlandt, Greeley, Ruggiero & Perle

[57] ABSTRACT

A superconducting bearing assembly includes a coil field source that may be superconducting and a superconducting structure. The coil field source assembly and superconducting structure are positioned so as to enable relative rotary movement therebetween. The structure and coil field source are brought to a supercooled temperature before a power supply induces a current in the coil field source. A Meissner-like effect is thereby obtained and little or no penetration of the field lines is seen in the superconducting structure. Also, the field that can be obtained from the superconducting coil is 2–8 times higher than that of permanent magnets. Since the magnetic pressure is proportional to the square of the field, magnetic pressures from 4 to 64 times higher are achieved.

7 Claims, 4 Drawing Sheets

SUPERCONDUCTING LEVITATING BEARING

The U.S. Government has certain rights in this invention as a result of its development under NASA Contract NAS5-31275.

This is a continuation of application Ser. No. 959,729, filed on Oct. 13, 1992, now abandoned.

FIELD OF THE INVENTION

This invention relates to superconducting rotating devices and, more particularly, to superconducting bearings which achieve a levitating force through operation of a flux-exclusion or Meissner-like effect.

BACKGROUND OF THE INVENTION

Since the discovery of high $T_c$ superconducting materials, many proposals have been made for applications of such materials. The availability of high $T_c$ materials in wire form has led to uses such as transformer windings, (see U.S. Pat. No. 5,107,240 to Tashiro et al); as a superconducting magnet (see U.S. Pat. No. 5,113,165 to Ackermann); for providing superconducting current connectors (see U.S. Pat. No. 4,895,831 to Laskaris); and for other and varied purposes (see U.S. Pat. No. 4,914,081 to Miller et al and U.S. Pat. No. 4,923,850 to Stephan et al.).

In U.S. Pat. No. 5,015,622 to Ward et al., a superconducting stepping motor is described wherein a magnetized article is suspended over a stator and, via appropriate excitation, the magnetized article is moved over the stator's surface. U.S. Pat. No. 5,066,638 to Lloyd et al; and U.S. Pat. No. 5,099,162 to Sawada both describe the use of coils of superconducting material for electric motor winding applications. In each of these patents, support structures for the superconducting windings are conventional bearings.

The use of high $T_c$ superconductors for bearing structures has also been proposed. Such bearings make use of a Meissner-like effect that enables a stable levitating force to be achieved between a source of field lines and a superconducting surface. The Meissner-like effect is the result of a "repulsion" that occurs when field lines are prevented from penetrating a superconducting surface due to circulating currents on the surface that are induced by the field lines. More particularly, when a source of field lines is brought into juxtaposition to a superconducting surface, the field lines are diverted from the superconducting surface and a resulting "magnetic pressure" results between the source of the field lines and the superconducting surface, thereby creating the levitating force.

Bearing structures using Meissner-like effects can be found in U.S. Pat. No. 4,939,120 to Moon et al; U.S. Pat. No. 4,956,571 to Gordon et al and U.S. Pat. No. 5,061,679 to Weeks, II. Each bearing structure shown in the aforesaid patents includes permanent magnets that are positioned in juxtaposition to a superconducting surface. Under such conditions (especially with type II superconductors), when the bearing arrangement is supercooled, certain of the field lines are trapped in the superconducting material and create a "pinning" action. With type I superconductors, a similar flux penetration is seen—but without the pinning effect. In either case, the resulting "pressure" (or levitating force) decreases as the result of the flux penetration. Thus, while levitation pressures can be achieved using such structures, the load-bearing properties of such superconducting bearings is less than optimal.

Accordingly, it is an object of this invention to provide an improved magnetic bearing structure.

It is yet another object of this invention to provide a superconducting bearing structure wherein flux exclusion effects are enhanced.

It is still another object of this invention to provide a method for energizing a superconducting bearing structure wherein penetration of flux into a superconducting surface are minimized.

Another object of this invention is to provide a means to create a higher magnetic field intensity in a superconducting bearing structure than that achieved with permanent magnets.

SUMMARY OF THE INVENTION

A superconducting bearing assembly includes a coil field source that may be superconducting and a superconducting structure. The coil field source positioned so as to enable relative rotary movement therebetween. The structure/coil field source are brought to a supercooled temperature before a power supply induces a current in the coil field source. A Meissner-like effect is thereby obtained and little or no penetration of the field lines is seen in the superconducting structure. Also, the field that can be obtained from the superconducting coil is 2–8 times higher than that of permanent magnets. Since the magnetic pressure is proportioned to the square of the field, magnetic pressures from 4 to 64 times higher are achieved.

DETAILED DESCRIPTION OF THE INVENTION

As indicated above, prior art superconducting bearings have used permanent magnets as the source of magnetic field. Such magnets have achieved levitation pressures that are limited by the maximum magnetic field which, for rare earth materials, is approximately 5,000 Gauss or 0.5 Tesla for free air magnetic paths. This limits the magnetic levitation pressure to approximately 10–20 Newtowns/cm$^2$.

This invention makes use of the fact that wound superconducting magnets can achieve fields of up to 2 Tesla for small rotor sizes (2–3 centimeter/diameter) and up to 3–4 Tesla for larger shaft diameters. Since magnetic pressure increases shaft diameters. Since magnetic pressure increases as the square of the magnetic field, a field of 2 Tesla can generate pressures and forces of up to 16 times that of a rare earth-based rotor/magnet superconducting bearing. It is to be understood that while the invention will be described as employing superconducting coil structures for field generation, non-superconducting coil structures (i.e. normal conductor) may also be used for stator applications, with a concomitant lessening of the magnetic field for equivalent structure sizes.

Figure 1:
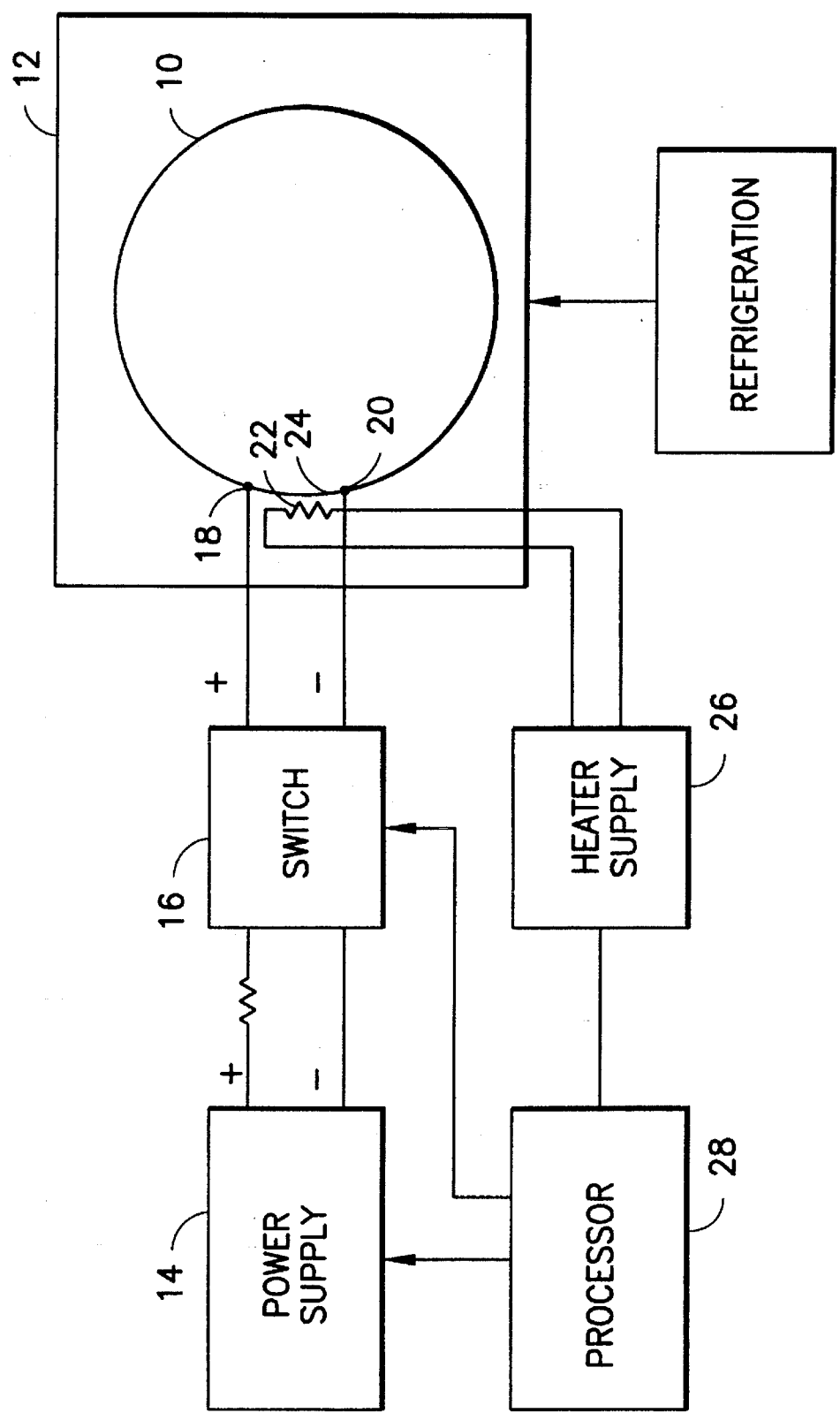
FIG. 1 is a circuit diagram of a system for energizing a superconducting coil.

In order to achieve a circulating current in a winding of a superconducting magnet, the winding must be charged when it is in the superconducting state. A circuit for accomplishing such charging is shown in FIG. 1 wherein winding 10 schematically illustrates a closed superconducting coil. Coil 10 is maintained within an enclosure 12 (schematically shown) that maintains coil 10 at a superconducting temperature. A power supply 14 is connected through a switch 16 to a pair of terminals 18 and 20 that are spaced apart on coil 10. A heater 22 is juxtaposed to a portion 24 between terminals 18 and 20 on coil 10 and is connected to a heater supply 26.

When heater 22 is energized by heater supply 26, coil portion 24 loses its superconducting state and appears as a resistance between terminals 18 and 20. When switch 16 connects power supply 14 to terminals 18 and 20 and coil portion 24 is in the resistive state, a current flow is established.

So long as heater 22 is energized by heater supply 26, current continues in the normal manner, notwithstanding the supercooled state of the remainder of coil 10. A processor 28 or an equivalent sequencer controls the operation of power supply 14, switch 16 and heater supply 26.

To obtain the desired circulating current in coil 10, heater 22 is initially energized so that winding portion 24 is in the resistive state. Switch 16 closes and applies power supply 14 to terminals 18 and 20 to cause a current flow through coil 10. Heater supply 26 is then turned off by processor 28 and shortly thereafter, when coil portion 24 approaches a superconducting state, switch 16 disconnects power supply 14 from terminals 18 and 20 and a circulating current results in coil 10.

Figure 2:
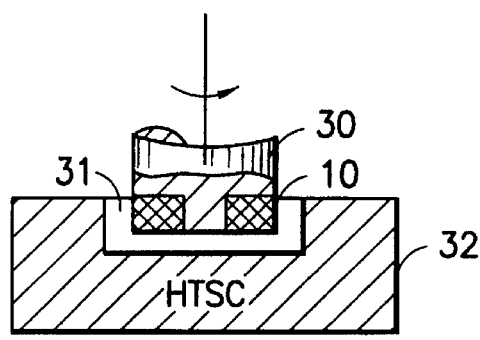
FIG. 2 is a section of a superconducting bearing assembly comprising a superconducting disk-shaped member with a superconducting rotary coil.

In FIG. 2, a superconducting bearing structure is illustrated that employs coil 10 as a source of field lines to enable the creation of a Meissner-like effect. Coil 10 is wound around the lower portion of a shaft 30 which, in turn, mates with a cylindrical inset 31 in high temperature superconductor member (HTSC) 32. So long as coil 10 is energized by the circuit shown in FIG. 1 after the entire bearing structure has been brought to the superconducting state, the magnetic field lines created by coil 10 are prevented from penetrating bearing member 32. As a result, the magnetic field lines are confined by the cylindrical walls of the inset 31 in bearing member 32 and create a supporting magnetic pressure that maintains shaft 30 in a balanced, elevated state. While not shown, connections to coil 10 and to heater 22 that is embedded therewith (not shown in FIG. 2), are provided by circumferential contact pads on shaft 30.

Figure 3:
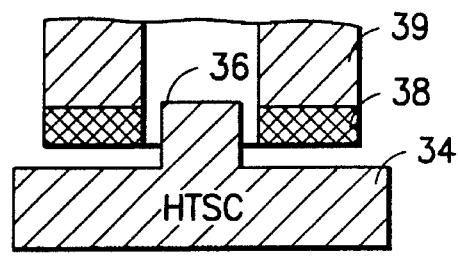
FIG. 3 is a section of a superconducting bearing assembly incorporating a T shaped superconducting member with a rotating, donut-shaped superconducting winding.

In FIG. 3, a section of a bearing structure is illustrated wherein HTSC bearing member 34 is provided with a central pedestal 36. A donut shaped coil 38 is energized and the field created thereby is channeled by pedestal 36 and horizontal portions of HTSC bearing member 34 to maintain coil 38 in a centered position about pedestal 36. As with FIG. 2, coil 38 must only be energized after HTSC member 34 has been brought to a superconducting temperature. This prevents the trapping of field lines generated by coil 38 and maximizes the levitating magnetic pressure.

Figure 4:
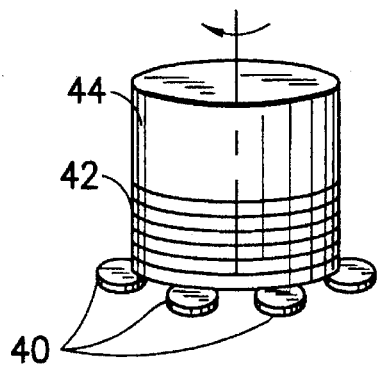
FIG. 4 is a perspective view of a thrust bearing employing the invention with discrete superconducting bearing elements.

In FIG. 4, a plurality of discrete HTSC disks 40 comprise a thrust bearing structure for a rotating coil 42 that is mounted on a shaft 44. By equidistant placement of stator disks 40 about coil 42, the field generated by coil 42 maintains shaft 44 in a stably levitated position.

Figure 5:
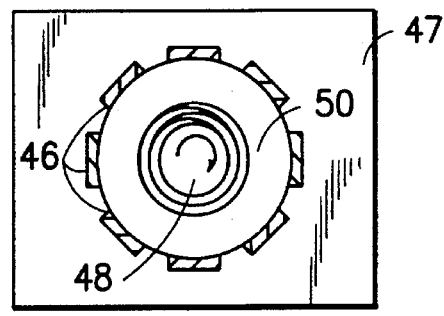
FIG. 5 is an end sectional view of a rotary bearing that employs individual high temperature superconducting inserts.

In FIG. 5, a plurality of discrete HTSC disks 46 are positioned by support 47 to surround a rotor 48 on which a coil 50 is mounted. As a result, the field generated by coil 48 is constrained within a region 52 that surrounds rotor 48 and thereby provides a stable levitating force therefor.

Figure 6:
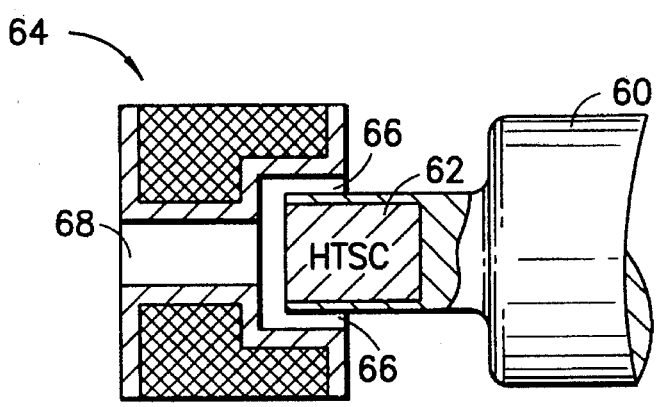
FIG. 6 illustrates a stator superconducting winding for maintaining a high temperature super conducting rotor in a levitated state.

In FIG. 6, superconducting rotor-bearing system is shown wherein rotor 60 includes an HTSC insert 62. A superconducting stator coil 64 includes a cylindrical inset section 66 and an aperture 68. The magnetic field lines created by the energization of coil 64 are channelled around HTSC insert 62 and establish an electromagnetic pressure which levitates HTSC portion 62 and prevents it from contacting the walls of inset 66. While coil 64 is shown as stationary and HTSC portion 62 is shown as the rotating member, the relative positions thereof may be reversed to also create an all superconducting rotor-bearing system.

In all of the above cases, it is critical that the system be at the superconducting temperature when the electromagnetic coil is charged with its circulating current. This prevents the field lines from being trapped by the HTSC member and enables a maximum levitating force to be generated in the bearing structure. The superconducting coil may be comprised of any material which exhibits superconducting properties at supercooled temperatures. For instance, wire made from Nb-Ti, Nb-Sn, YBCO (yttrium, barium, copper, oxygen), BSCCO (bismuth, strontium, calcium, copper, oxygen), and other superconducting wires (with an included persistent current switch) are acceptable. The HTSC inserts and/or bearing structures are preferably comprised of YBCO, or BSCCO.

EXAMPLE

Figure 7:
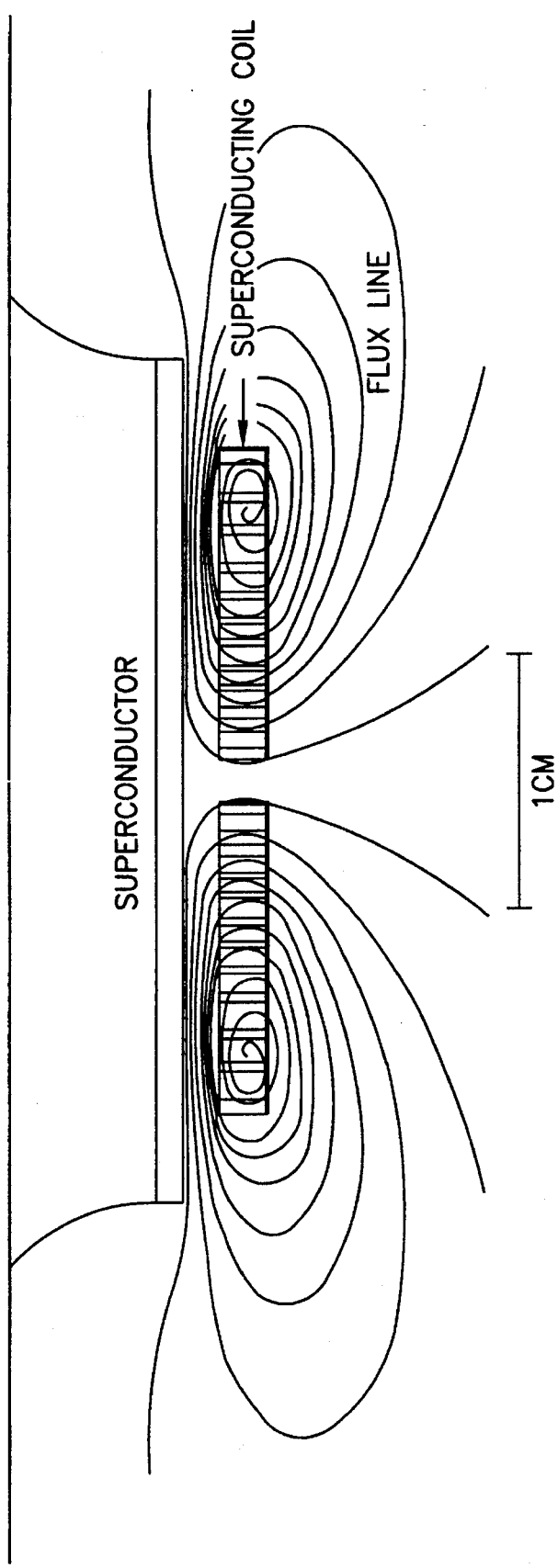
FIG. 7 is a sectional view of an experimental coil/superconductor arrangement.

In order to test magnetic levitation forces, a small low-temperature superconducting flat solenoid was designed to generate fields between 1–2 Tesla at 4.2 degrees K. A superconducting coil (See FIG. 7) of niobium titanium wire consisting of 453 turns and 28 layers, with 3.2 millimeter inner diameter and 23.5 millimeter outer diameter was the source of the magnetic field. The coil was calibrated with a Gauss-meter at liquid nitrogen temperature. It was calculated that a current of 100 amperes produced a field of over 2 Tesla. The coil was mounted on a load cell which measured the force acting on the coil. Four strain gauges were mounted to the load cell to eliminate any torque from the measurements.

The displacement of the superconducting sample was measured with a thin beam attached to one end of the structure with the other end attached to the moveable part. The superconducting sample was placed in a sample holder which was attached to a moveable rod. The other end of the rod was attached to a motorized translation stage. After cooling to a temperature of liquid helium, the load cell and the displacement gauges were calibrated before the experiment was run.

The superconducting sample used in the experiment was produced by the melt-powder-melt-growth described by Dr.

M. Murakami et al in the Japan Journal of Applied Physics., volume 28: L1125, (1989). The sample was placed above the coil in such a way that their axes of symmetry were aligned. The sample was cooled in zero magnetic field. After the temperature of liquid helium was reached, and the gauges were calibrated, current was turned on through the coil.

Figure 8:
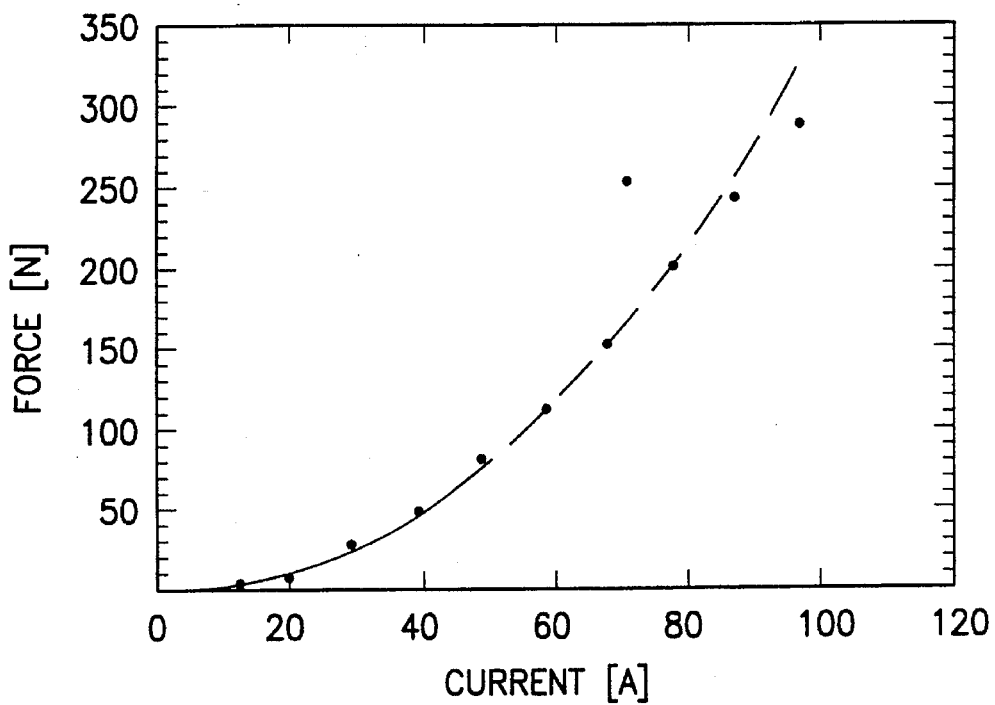
FIG. 8 is a plot of current vs. force for the experimental arrangement of FIG. 7.
Figure 9:
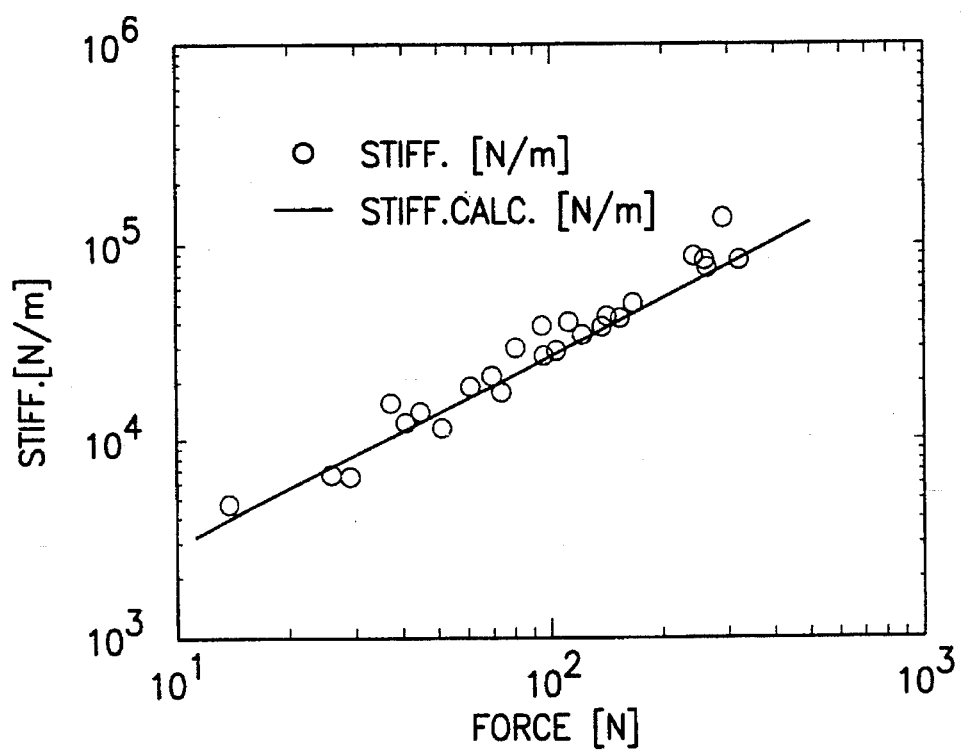
FIG. 9 is a plot of distance vs. force for the experimental arrangment of FIG. 7.

For 100 amperes per turn, a nominal field of 2 Tesla produced a magnetic levitation force in the YBCO of 300 N (capable of lifting over 30 kilograms of mass). The force acting on the coil did not show any hysteresis which meant that the sample behaved as if it were a type I superconductor. The experimental conditions were also simulated numerically, assuming that the sample was a perfect superconductor. The comparison of stiffness measurements from both experimental and simulated results showed excellent agreement. The data showed that the magnetic force was nearly proportional to the square of the current in the coil (See FIG. 8). The stiffness was shown to be proportional to the force (See FIG. 9).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A superconducting bearing assembly comprising:

superconducting structure means comprised of bulk material including a concave receptacle, said bulk material exhibiting superconducting characteristics when subjected to a temperature at or below said material's superconducting transition temperature $T_c$;

coil means movably mounted in juxtaposition to said superconducting structure means and including a portion that fits within said concave receptacle in said bulk material;

cooling means for bringing said superconducting structure means to a superconducting state and for maintaining said superconducting state on said superconducting structure means; and power control means for inducing a current in said coil means only after said superconducting structure means is at said superconducting state so as to achieve a substantial levitating effect as the result of an electromagnetic field created by said current in said coil means, the current induced in said coil means creating an electromagnetic field that magnetically interacts with said concave receptacle in said bulk material so as to maintain said coil means in a stable levitated position within said concave receptacle.

2. The superconducting bearing assembly as recited in claim 1 wherein said coil means is comprised of a conductor that exhibits superconducting properties, said cooling means also causing said coil means to be brought to the superconducting state.

3. The superconducting bearing assembly as recited in claim 2 wherein said power control means comprises:

heater means juxtaposed to a portion of said coil means, said heater means preventing said portion from entering said superconducting state when said heater means is energized;

means for energizing said heater means;

means for inducing a current in said coil means; and means for controlling said energizing means and said heater means to induce a current flow in said coil means and to subsequently deenergize said heater means so as to enable a current flow in said coil means said superconducting state, said portion of said coil means entering said superconducting state when said heater means is deenergized.

4. A superconducting bearing assembly comprising:

superconducting structure means comprised of a plurality of high temperature superconducting, electrically passive, bulk material structures that are positioned in a circular fashion and which exhibit superconducting characteristics when subjected to a temperature at or below said bulk material's superconducting transition temperature $T_c$;

coil means mounted on a rotor, said rotor movably mounted in juxtaposition to said superconducting structure means so as to position said bulk material structures equidistantly thereabout;

cooling means for bringing said superconducting structure means to a superconducting state and for maintaining said superconducting state on said superconducting structure means; and power control means for inducing a current in said coil means only after said superconducting structure means is at said superconducting state so as to achieve a substantial levitating effect on said rotor as the result of an electromagnetic field created by said current in said coil means, the current induced in said coil means creating an electromagnetic field that magnetically interacts with said electrically passive bulk material structures so as to maintain said rotor in a stable levitated position.

5. A superconducting bearing assembly comprising:

superconducting structure means comprised of bulk material including a convex protrusion, said bulk material exhibiting superconducting characteristics when subjected to a temperature at or below said material's superconducting transition temperature $T_c$;

coil means movably mounted in juxtaposition to said superconducting structure means and including a concave receptacle for receiving said convex protrusion from said bulk material;

cooling means for bringing said superconducting structure means to a superconducting state and for maintaining said superconducting state on said superconducting structure means; and power control means for inducing a current in said coil means only after said superconducting structure means is at said superconducting state so as to achieve a substantial levitating effect as the result of an electromagnetic field created by said current in said coil means, the current induced in said coil means creating an electromagnetic field that magnetically interacts with said convex protrusion from said bulk material so as to maintain said coil means in a stable levitated position about said convex protrusion.

6. The superconducting bearing assembly as recited in claim 5 wherein said coil means is comprised of a conductor that exhibits superconducting properties, said cooling means also causing said coil means to be brought to the superconducting state.

7. The superconducting bearing assembly as recited in claim 6 wherein said power control means comprises:

heater means juxtaposed to a portion of said coil means, said heater means preventing said portion from entering said superconducting state when said heater means in energized;

means for energizing said heater means;

means for inducing a current in said coil means; and means for controlling said energizing means and said heater means to induce a current flow in said coil means and to subsequently deenergize said heater means, said portion of said coil means entering said superconducting state when said heater means is deenergized.

* * * * *